(12) United States Patent
Langos

(10) Patent No.: US 8,194,843 B2
(45) Date of Patent: Jun. 5, 2012

(54) METHOD AND APPARATUS FOR BUSY OVERRIDE IN AN INTERNET PROTOCOL-BASED TELEPHONE SYSTEM

(75) Inventor: Geoffrey P. Langos, Manalapan, NJ (US)

(73) Assignee: Vonage Network LLC, Holmdel, NJ (US)

( * ) Notice: Subject to any disclaimer, the term of this patent is extended or adjusted under 35 U.S.C. 154(b) by 544 days.

(21) Appl. No.: 12/483,303

(22) Filed: Jun. 12, 2009

(65) Prior Publication Data

US 2010/0316208 A1    Dec. 16, 2010

(51) Int. Cl.
*H04M 3/42* (2006.01)
(52) U.S. Cl. .............................. 379/208.01; 379/215.01
(58) Field of Classification Search .............. 379/215.01, 379/142.08, 207.02, 207.1, 208.01
See application file for complete search history.

(56) References Cited

U.S. PATENT DOCUMENTS

| | | | |
|---|---|---|---|
| 5,757,899 A | 5/1998 | Boulware et al. |
| 6,374,102 B1 | 4/2002 | Brachman et al. |
| 6,415,026 B1 | 7/2002 | Flood |
| 6,418,216 B1 | 7/2002 | Harrison et al. |
| 6,519,335 B1 | 2/2003 | Bushnell |
| 2008/0205619 A1 | 8/2008 | Kalaboukis et al. |

*Primary Examiner* — Creighton Smith
(74) *Attorney, Agent, or Firm* — Moser Taboada; Joseph Pagnotta

(57) ABSTRACT

Method and apparatus for busy override in an internet protocol-based telephone system are described. In some examples, a first communication attempt of a third party is received by a first party, the first party being in an established communication session with a second party over a communication network. A timer is initiated in response to the first communication attempt. A busy operation is performed with respect to the third party in response to the first communication attempt. At least one additional communication attempt by the third party is received during the established communication session. A busy override operation is performed with respect to the first party in response to the first communication attempt and the at least one additional communication attempt satisfying a threshold pattern of communication attempts, the threshold pattern being based on elapsed time of the timer.

20 Claims, 4 Drawing Sheets

METHOD AND APPARATUS FOR BUSY OVERRIDE IN AN INTERNET PROTOCOL-BASED TELEPHONE SYSTEM

BACKGROUND OF THE INVENTION

1. Field of the Invention

The present invention relates generally to telecommunication systems and, more particularly, to a method and apparatus for busy override in an internet protocol-based telephone system.

2. Description of the Related Art

Voice over IP (VoIP) is a recent technological development in the field of telecommunications that is utilized to transmit voice conversations over a data network using the Internet Protocol (IP). After a user subscribes to a VoIP service, the user can make phone calls to other VoIP subscribers or to public switched telephone network (PSTN) customers and access a number of features associated with the VoIP service, such as call waiting, three-way calling, call forwarding, voicemail service, and the like. Notably, call waiting is a telephony service where a user is able to suspend a current telephone call and switch to a new incoming telephone call. Typically, the user is alerted to the new incoming call by a tone or like type indication. The user can then switch back-and-forth between the previous and new telephone calls.

Typically, the user is afforded the opportunity to turn the call waiting feature on or off at will. For example, the user can enter a predefined sequence prior to dialing a telephone number, such as *70 or the like, to disable call waiting for an individual call. In another example, a user can log into an account manager (e.g., via the Internet) and turn off call waiting for all calls. When call waiting has been so disabled, the VoIP system will not alert the user of new incoming calls while the user is on a current call. Instead, the VoIP system designates user as busy. For example, the VoIP system may send all new incoming calls to voicemail or return a busy signal thereto while the user is on a current call.

One problem with the current call waiting feature is the inability to reach a user who has disabled call waiting during an emergency. For example, a user may generally desire to disable call waiting, but would not mind being interrupted by an incoming call in case of emergency. Presently, a caller must try and contact the user who has disabled call waiting using another mechanism when the user is on a call, such as trying the user's mobile telephone, calling the user's neighbor, and the like, to the extent the caller even knows any of these alternative mechanisms. This may prevent the user from receiving urgent information in a timely manner.

Accordingly, there exists a need in the art for a method and apparatus for a busy override feature in an internet protocol-based telephone system, such as a VoIP system.

SUMMARY OF THE INVENTION

Embodiments of the invention relate to a method, apparatus, and computer readable medium for processing communication attempts during an established communication session over a communication network. In some embodiments, a first communication attempt of a third party is received by a first party, the first party being in the established communication session with a second party over the communication network. A timer is initiated in response to the first communication attempt. A busy operation is performed with respect to the third party in response to the first communication attempt. At least one additional communication attempt by the third party is received during the established communication session. A busy override operation is performed with respect to the first party in response to the first communication attempt and the at least one additional communication attempt satisfying a threshold pattern of communication attempts, the threshold pattern being based on elapsed time of the timer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
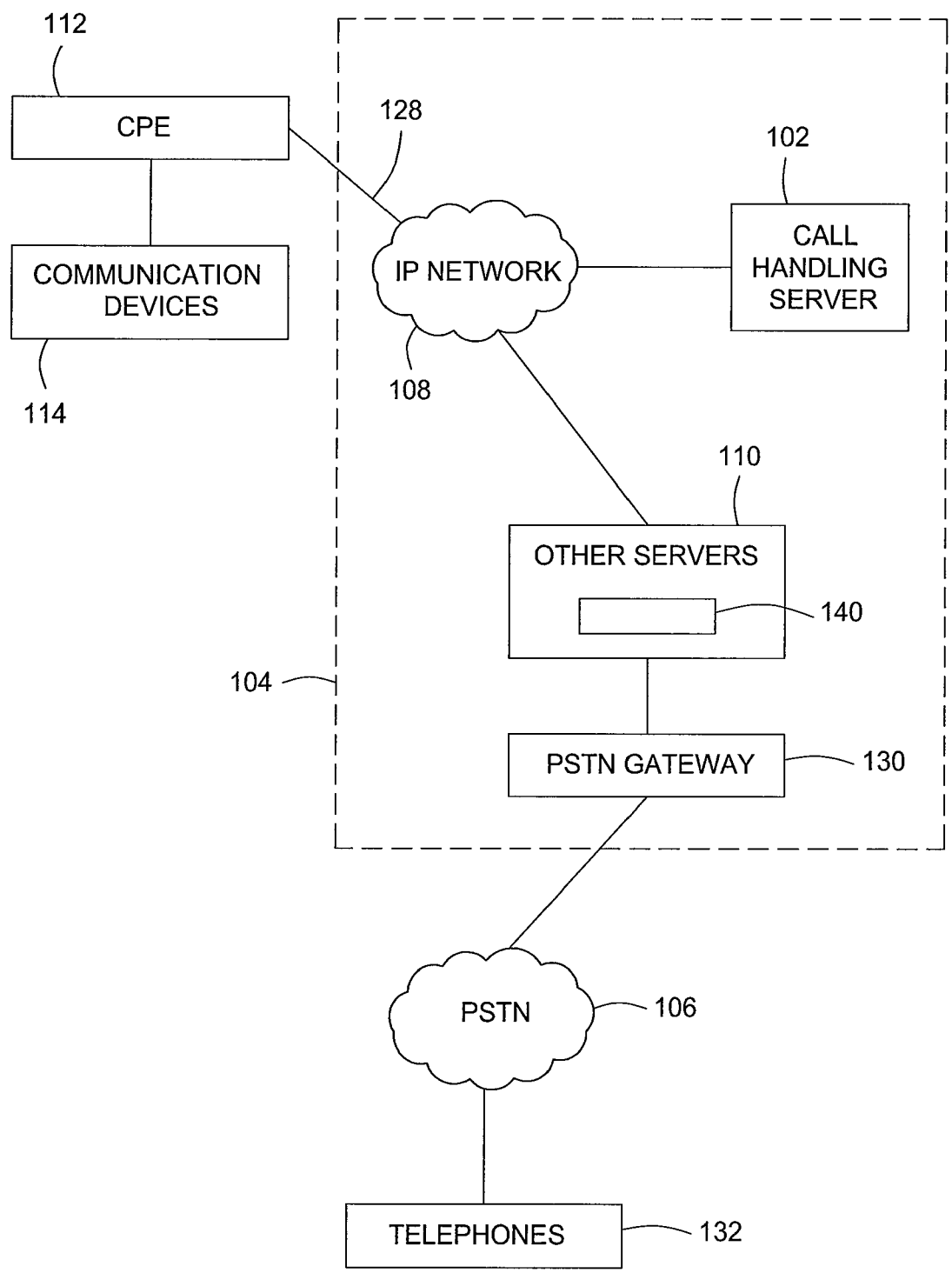
FIG. 1 is a block diagram depicting an exemplary embodiment of a communication system in accordance with one or more aspects of the invention.

FIG. 1 is a block diagram depicting an exemplary embodiment of a communication system 100 in accordance with one or more aspects of the invention. The communication system 100 includes a voice-over-internet-protocol (VOIP) network 104 (generally referred to as a telecommunication system) and a public switched telephone network (PSTN) 106. The VOIP network 104 includes a call handling server 102 and a plurality of other servers 110 coupled to an internet protocol (IP) network 108. The servers 110 may include various well known servers configured to facilitate VOIP services, such as provisioning servers, proxy servers, media relay servers, and the like. The call handling server 102 is configured to handle calls to and from users of the VOIP network 104, as described below. The servers 102 and 110 may be implemented using a plurality of computer systems and like type general and/or specific purpose devices and systems. The one or more of the servers 110 may be coupled to a PSTN gateway 130, which in turn is coupled to the PSTN 106. The PSTN 106 provides conventional telephone service to a plurality of telephones 132.

Various customer premises equipment (CPE) 112 are coupled to the IP network 108 via links 128. Various communication devices 114 may be coupled to the CPE 112. The CPE 112 may include modems, terminal adapters, routers, and the like configured to provide an interface between the communication devices 114 and the IP network 108. The communication devices 114 may comprise telephones, video phones, computers, mobile devices, and the like. The CPE 112 and the communication devices 114 may be distributed among a plurality of subscribers to VOIP services provided by the VOIP network 104. The links 128 may include cable, digital subscriber line (DSL), or like type communication links known in the art.

In general operation, subscribers use the communication devices 114 and the CPE 112 to convert content (e.g., voice, video, data, some or all of which may be analog) and signaling into VOIP-based content and signaling ("a VOIP call"). VOIP calls may be transmitted to the IP network 108 via the CPE 112 over the links 128. Those skilled in the art will appreciate that the VOIP calls may pass through other IP networks before reaching the IP network 108 of the VOIP network 104. For example, the VOIP calls may pass through various IP networks of the Internet before being routed to the IP network 108 (e.g., internet service provider (ISP) networks, backbone networks, etc.). VOIP calls may be processed by the call handling server 102 and the servers 110. VOIP calls may be directed to other subscribers of the VOIP network 104, to subscribers of other VOIP networks (not shown), or to subscribers of traditional telephone services (e.g., the PSTN 106).

Some embodiments of the invention relate to providing a busy override feature using an IP-based telecommunication system, such as the VOIP network 104. Generally, when a subscriber activates their service (e.g., a VOIP service), they have access to a number of features, such as but not limited to, call waiting, call forwarding, do not disturb, caller ID, three-way calling, and the like. A subscriber can activate/deactivate features through interaction with a management system 140 (e.g., using the communication devices 114). The management system 140 may be implemented by one or more of the servers 110.

Notably, a subscriber may use the management system 140 to enable or disable a call waiting feature. If call waiting is enabled through the management system 140, then the subscriber will be alerted to, and permitted to switch to, new incoming calls during a telephone call. If call waiting is disabled through the management system 140, then the subscriber will not, in general, be alerted to any incoming calls during a telephone call (exception for busy override discussed below). Instead, the subscriber will be deemed to be "busy" and a busy operation will be performed, such as forwarding the incoming call to voicemail, returning a busy signal, forward the call to another party, connecting the call to an interactive voice response (IVR) system, or the like. In some embodiments, if call waiting is generally enabled through the management system 140, a subscriber may selectively disable call waiting for a particular telephone call, e.g., by entering a particular indicator before dialing a telephone number, such as *70 or the like. If call waiting is selectively disabled for a particular telephone call, then the subscriber will not, in general, be alerted to any incoming calls during a telephone call (exception for busy override discussed below).

In some embodiments, the call handling server 102 is configured to handle incoming and outgoing calls to and from the communication devices 114 of the subscribers. When a subscriber initiates an outgoing call to a particular telephone number, the call handling server 102 begins a process for connecting to a communication device associated with the dialed telephone number. The call handling server 102 is further configured to implement a busy override feature for each subscriber. In particular, the call handling server 102 can query the management system 140 using an identifier for the subscriber making a call to determine whether call waiting is enabled for the subscriber. In some embodiments, the call handling server 102 can determine whether the subscriber making the outgoing call has selectively disabled call waiting (e.g., by detecting a predefined indicator, such as *70). If call waiting is enabled, the call handling server 102 implements a call waiting operation in response to incoming calls received during a previously established communication session. If call waiting is disabled, the call handling server 102 executes a process to determine whether a busy operation or a busy override operation should be performed. A busy operation may include sending an incoming call to voicemail of the subscriber, returning a busy signal to the caller, forwarding the incoming call to another party, forwarding the incoming call to an IVR system, or the like. A busy override operation may include implementing the call waiting operation despite the disabled status of the call waiting feature. The call handling server 102 can implement a method that effectively detects a pattern of incoming calls from a particular caller indicative of an urgent need for communication. Embodiments of methods performed by the call handling server 102 are discussed below.

Figure 2:
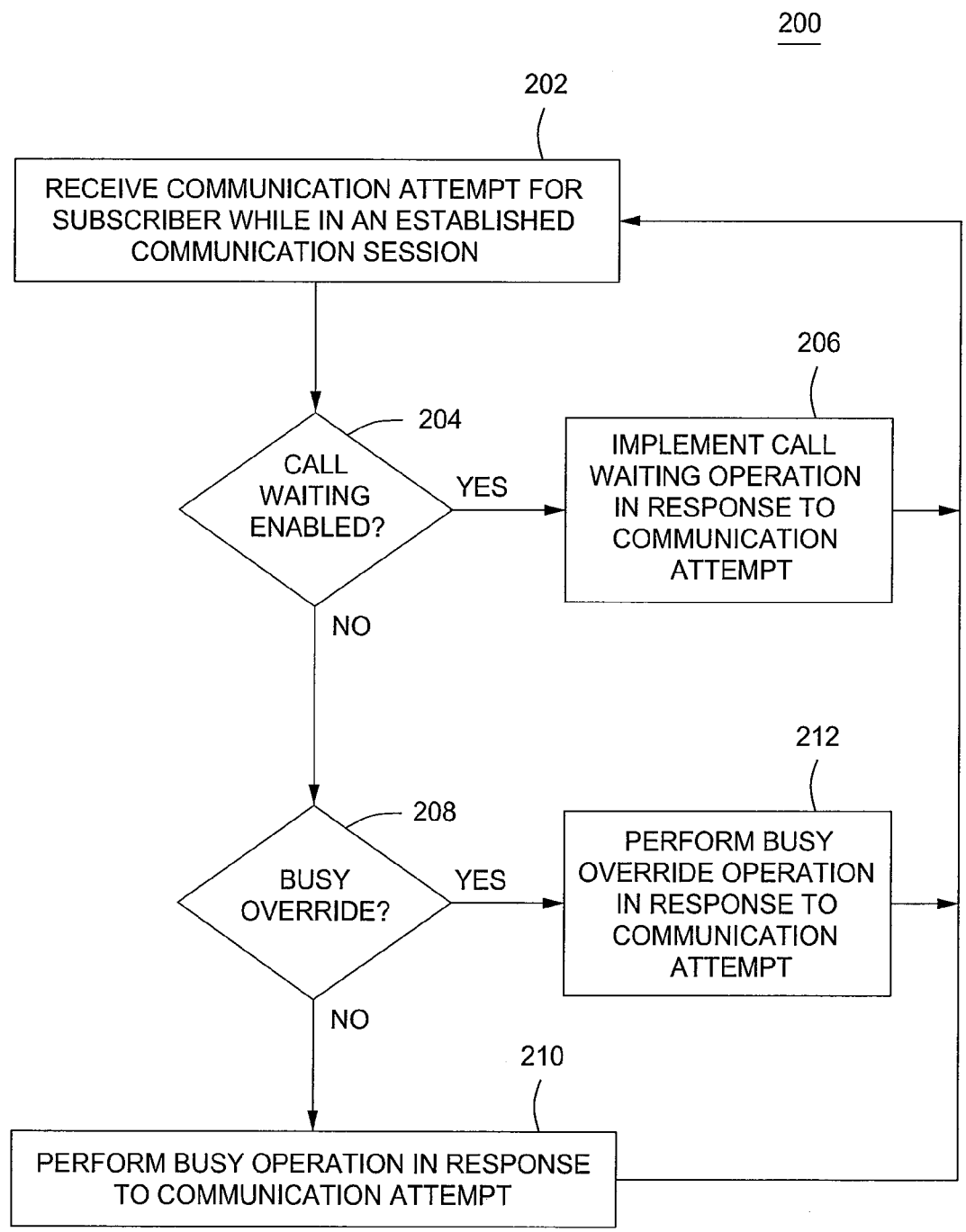
FIG. 2 is a flow diagram depicting a method of handling incoming calls during an established communication session according to some embodiments of the invention.

FIG. 2 is a flow diagram depicting a method 200 of handling incoming calls during an established communication session according to some embodiments of the invention. The method 200 may be performed by the call handling server 102. Assume that a subscriber has initiated a telephone call and is currently connected to another communication device through the VOIP network 104 (referred to as an "established communication session").

The method 200 begins at step 202, where the call handling server 102 receives a communication attempt for the subscriber while the subscriber is in the established communication session. For example, the communication attempt may be an incoming call destined for the subscriber. The subscriber may also be referred to herein as the "first party." The other party or parties in the established communication session are referred to as the "second party." The party providing the communication attempt during the established communication session may be referred to herein as the "third party."

At step 204, the call handling server determines whether call waiting is enabled for the subscriber. In some embodiments, the call handling server 102 has determined whether call waiting is enabled for the subscriber during initiation of the established communication session (e.g., via interaction with the management system 140 or via receiving the predefined indicator for selectively disabling call waiting, as discussed above). Alternatively, if the subscriber did not selectively disable call waiting, the call handling server 102 may query the management system 140 upon the call handling server 102 receiving an incoming call during the established communication session.

In either case, if the call handling server 102 indicates call waiting is enabled, the method 200 proceeds to step 206. At step 206, the call handling server 102 implements a call waiting operation. For example, the call handling server 102 can send an indication to the subscriber of the communication attempt, and implement switching between the established communication session and a newly established communication session for the communication attempt.

If at step 204 call waiting has been disabled, then the method 200 proceeds to step 208. At step 208, the call handling server 102 determines whether a busy operation or a busy override operation should be performed. If a busy operation should be performed, the method 200 proceeds to step 210. At step 210, the call handling server 102 performs the busy operation. In some embodiments, the busy operation includes forwarding the communication request to a voicemail box for the subscriber (e.g., implemented by one of the servers 110). In some embodiments, the busy operation includes sending a busy signal to the communication device that originated the communication attempt. In some embodiments, the busy operation includes forwarding the call to another party (e.g., another party may be designated by the subscriber). In some embodiments, the busy operation includes forwarding the call to an IVR system. In any case, in the busy operation, the subscriber is not alerted as to the communication attempt during the established communication session.

If at step 208 the call handling server 102 determines that a busy override operation should be performed, the method 200 proceeds to step 212. At step 212, the call handling server 102 performs the busy override operation. The busy override operation may include the call handling server 102 implementing a call waiting process. For example, the call handling server 102 can send an indication to the subscriber of the communication attempt, and implement switching between the established communication session and a newly established communication session for the communication attempt. The method 200 may return to step 202 and repeat for additional communication attempts during the established communication session. The method 200 may be performed for various subscribers having established communication sessions.

Figure 3:
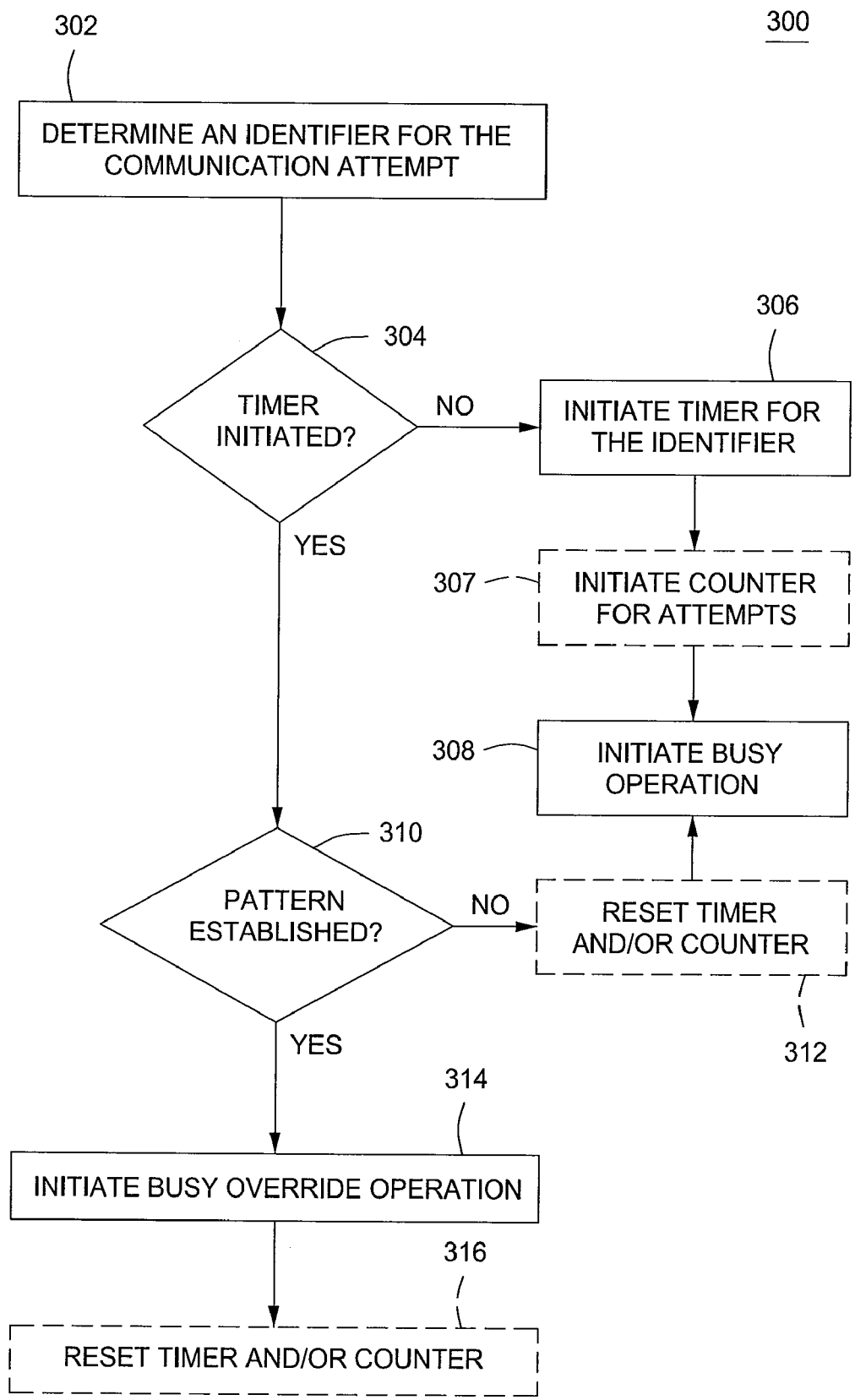
FIG. 3 is a flow diagram depicting a method of selectively implementing a busy override operation according to some embodiments of the invention.

FIG. 3 is a flow diagram depicting a method 300 of selectively implementing a busy override operation according to some embodiments of the invention. The method 300 may be performed by the call handling server 102 during step 208 to determine whether a busy override operation or busy operation should be performed given a particular communication attempt. The method 300 begins at step 302, where the call handling server 102 determines an identifier for the origin of the communication attempt (e.g., a telephone number associated with the calling communication device or like type identifier). At step 304, the call handling server 102 determines whether a timer has been initiated for the identifier. If not, the method 300 proceeds to step 306, where the call handling server 102 initiates a timer associated with the identifier. The method 300 proceeds to step 308, where the call handling server 102 signals a busy operation should be performed. At an optional step 307, the call handling server 102 may also initialize a counter of the number of communication attempts for the identifier (initially set to one attempt).

If at step 304 the call handling server 102 is maintaining a timer for the identifier, the method 300 proceeds to step 310. That is, if a timer has been established for the identifier, then this is not the first communication attempt for the identifier received during the established communication session. Thus, more than one communication attempt from an identifier has been received over a particular period of time (e.g., a "pattern" of communication attempts for the identifier). At step 310, the call handling server 102 determines whether the communication attempt establishes a pattern of communication attempts that satisfies a threshold pattern.

Notably, the threshold pattern can be defined by a threshold number of communication attempts within a threshold time period. As noted in step 306, the call handling server 102 maintains a timer that begins tracking elapsed time from the first communication attempt for the identifier. In some embodiments, the test at step 310 may be to determine whether a second communication attempt has been received within a threshold elapsed time (e.g., a second communication attempt within 60 seconds of the first communication attempt). In such an embodiment, the call handling server 102 may only use the timer for elapsed time, and not maintain a count for the communication attempts (since the existence of the timer indicates a first attempt and the test at step 304 indicates a second attempt).

In some embodiments, the threshold pattern can include any number of communication attempts within any one time period (e.g., in general, some number of communication attempts within some time period). In such cases, the call handling server 102 needs to maintain both the timer and a count of communication attempts.

In still further embodiments, the threshold pattern can include different numbers of communication attempts for different time periods, such as two attempts in one time period, three attempts in another time period, and so on. For example, two attempts in 60 seconds or three attempts in 90 seconds. In such cases, the call handling server 102 needs to maintain both the timer and a count of communication attempts.

In some embodiments, the subscriber may interact with the management system 140 to establish a desired threshold pattern (i.e., the threshold pattern can be selectable by the subscriber). The call handling server 102 can query the management system 140 to obtain the threshold pattern as set by the subscriber.

If at step 310 the communication attempt does not establish a pattern of communication attempts that satisfies the threshold pattern, the method 300 proceeds to step 308. That is, since the communication attempt does not cause the threshold pattern to be satisfied, a busy override operation is not invoked and a busy operation is indicated. At optional step 312, the timer and/or the counter for the identifier may be reset depending on the threshold pattern. For example, if the threshold pattern requires two attempts within some number of seconds, and the communication attempt does not satisfy this requirement, then the timer may be reset.

However, if at step 310 the communication attempt does establish a pattern of communication attempts that satisfies the threshold pattern, the method 300 proceeds to step 314. At step 314, the call handling server 102 initiates a busy override operation. As noted above, the busy override operation may be implemented using a call waiting operation. Assuming the subscriber knows that call waiting has been disabled, a call waiting alert notifies the subscriber of a potential emergency or that someone may be urgently attempting communication. At optional step 316, the timer and/or the counter for the identifier may be reset. The method 300 may be repeated for each communication attempt received during an established communication session for a subscriber.

Figure 4:
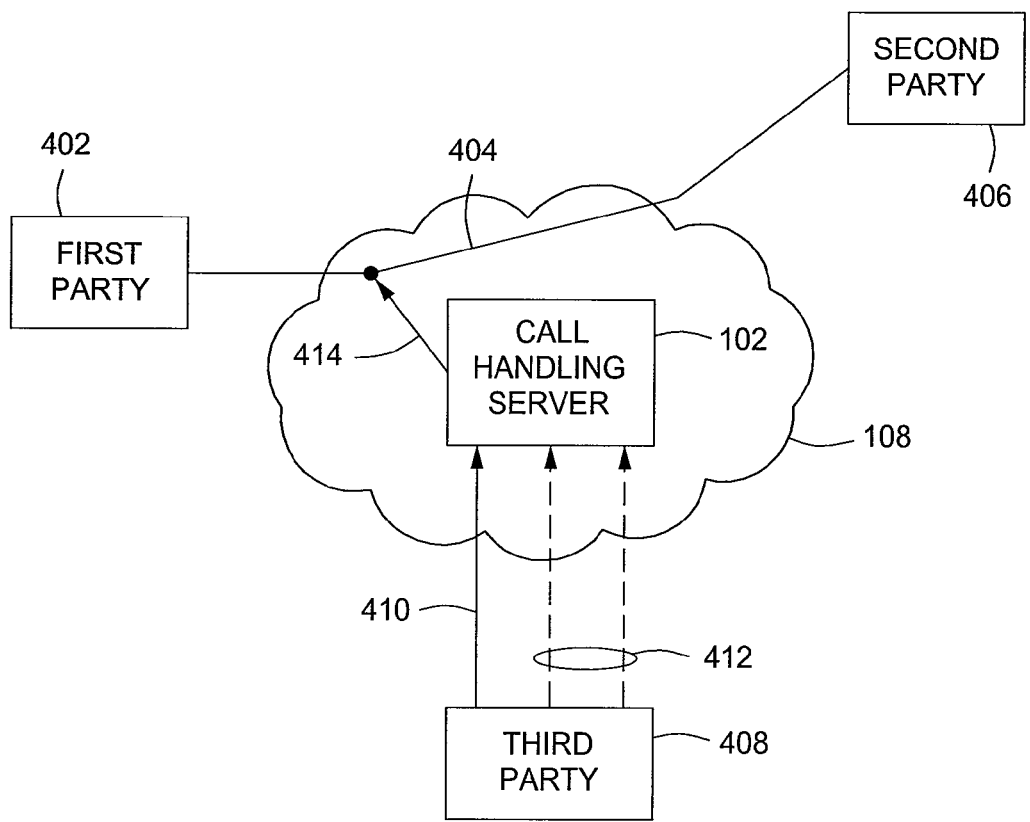
FIG. 4 is a block diagram depicting exemplary communication through a VOIP network according to some embodiments of the invention.

Aspects of the methods 200 and 300 may be understood with respect to the following example. FIG. 4 is a block diagram depicting exemplary communication through the VOIP network 104 according to some embodiments of the invention. A first party 402 is in an established communication session 404 with a second party 406 through the VOIP network 104. The first party 402 has disabled call waiting during the communication session 404. A third party 408 is attempting to communicate with the first party 402. The third party 408 initiates a first communication attempt 410 during the communication session 404. The first communication attempt 410 is received by the call handling server 102. In response to the first communication attempt 410, the call handling server 102 determines that call waiting has been disabled during the communication session 404, and performs a busy operation, as described above. The call handling server 102 maintains a timer and optionally a counter for an identifier associated with the third party 408.

The third party 408 then initiates at least one additional communication attempt 412 during the communication session 404. The additional attempt(s) 412 is/are received by the call handling server 102. The call handling server 102 notes the identifier of the third party 408, accesses the timer and optionally the counter, and determines whether the first communication attempt 410 and the at least one additional communication attempt 412 satisfy a threshold pattern of communication attempts. If so, the call handling server 102 performs a busy override operation 414 with respect to the first party 402 (e.g., by implementing a call waiting operation), as described above. Otherwise, the call handling server 102 performs a busy operation, as described above. This process may be extended for any number of communication attempts by the third party 408, and for any number of additional parties attempting the communicate with the first party 402.

Figure 5:
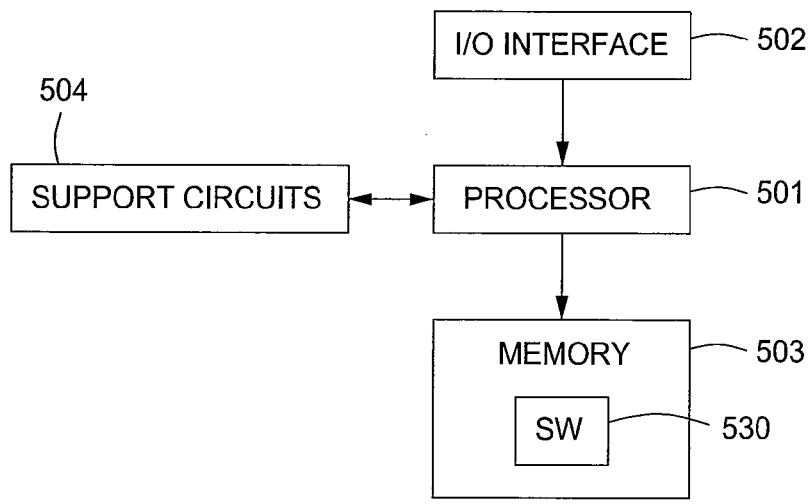
FIG. 5 is a block diagram depicting an exemplary embodiment of a computer in accordance with one or more aspects of the invention.

FIG. 5 is a block diagram depicting an exemplary embodiment of a computer 500 in accordance with one or more aspects of the invention. The computer 500 may be used to implement the call handling server 102 or any of the other servers 110. The computer 500 may be one of any form of a general purpose computer used in accessing and operating within an IP-based network. The computer 500 may include a processor 501, a memory 503, various support circuits 504, and an I/O interface 502. The processor 501 may include one or more microprocessors or the like known in the art. The support circuits 504 include conventional cache, power supplies, clock circuits, data registers, and the like. The I/O interface 502 is configured for communication with the IP network 108. The memory 503, or computer readable medium, may include one or more of the following random access memory, read only memory, magneto-resistive read/write memory, optical read/write memory, cache memory, magnetic read/write memory, and the like. The I/O interface 502 may be coupled to other servers, databases, and the like.

The memory 503 may store software 550 that is executed to perform methods of according to embodiments of the invention. For example, the software 550 can implement the methods 200 and 300 in the call handling server 102, described above. The software 550, when executed by the processor 501, transforms the general purpose computer into a specific purpose computer that controls methods described herein. Although embodiments of the process of the present invention are discussed as being implemented as a software routine, some of the method steps that are disclosed herein may be performed in hardware or a combination of hardware and software. As such, the invention may be implemented in software as executed upon a computer system, in hardware as an application specific integrated circuit or other type of hardware implementation, or a combination of software and hardware.

Additionally, the software 550 may be used to automatically manage one or more additional services that the telecommunications service provider offers, such as the management system 140 in the servers 110 or other services known to those skilled in the art of telecommunications. Further, the software 550 may act as a "stand alone" program or may be embedded with one or more other routines or programs that provide one or more additional telecommunication services. The software 550 of the present invention is capable of being executed on computer operating systems including but not limited to Microsoft Windows 98, Microsoft Windows XP, Apple OS X and Linux. Similarly, the software 550 of the present invention is capable of being performed using CPU architectures including but not limited to Apple Power PC, AMD/Intel x86, Sun SPARC, and Intel ARM.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of processing communication attempts during an established communication session over a communication network, comprising:
   receiving a first communication attempt by a third party to a first party, the first party being in the established communication session with a second party over the communication network;
   initiating a timer in response to the first communication attempt;
   performing a busy operation with respect to the third party in response to the first communication attempt;
   receiving at least one additional communication attempt by the third party during the established communication session; and
   performing a busy override operation with respect to the first party in response to the first communication attempt and the at least one additional communication attempt satisfying a threshold pattern of communication attempts, the threshold pattern being based on elapsed time of the timer.

2. The method of claim 1, further comprising:
   initiating a counter that maintains a count of the first communication attempt and the at least one additional communication attempt;
   wherein the threshold pattern is further based on the count of the counter.

3. The method of claim 2, wherein the threshold pattern includes at least one threshold count of the counter within at least one threshold elapsed time of the timer.

4. The method of claim 1, wherein the at least one additional communication attempt includes a second communication attempt, and wherein the threshold pattern includes the first communication attempt and the second communication attempt being within a threshold elapsed time of the timer.

5. The method of claim 1, wherein the step of performing the busy override operation comprises:
   notifying the first party during the established communication session of attempted communication by the third party.

6. The method of claim 1, wherein the step of performing the busy operation comprises one of:
   connecting the third party to a voicemail box of the first party;
   forwarding the third party to a fourth party;
   returning a busy signal to the third party; or
   connecting the third party to an interactive voice response (IVR) system.

7. The method of claim 1, wherein the first communication attempt includes an identifier, wherein the timer is associated with the identifier, and wherein each of the at least one additional communication attempt is associated with the identifier.

8. An apparatus for processing communication attempts during an established communication session over a communication network, comprising:
   means for receiving a first communication attempt by a third party to a first party, the first party being in the established communication session with a second party over the communication network;
   means for initiating a timer in response to the first communication attempt;

means for performing a busy operation with respect to the third party in response to the first communication attempt;

means for receiving at least one additional communication attempt by the third party during the established communication session; and means for performing a busy override operation with respect to the first party in response to the first communication attempt and the at least one additional communication attempt satisfying a threshold pattern of communication attempts, the threshold pattern being based on elapsed time of the timer.

9. The apparatus of claim 8, further comprising:

means for initiating a counter that maintains a count of the first communication attempt and the at least one additional communication attempt;

wherein the threshold pattern is further based on the count of the counter.

10. The apparatus of claim 9, wherein the threshold pattern includes at least one threshold count of the counter within at least one threshold elapsed time of the timer.

11. The apparatus of claim 8, wherein the at least one additional communication attempt includes a second communication attempt, and wherein the threshold pattern includes the first communication attempt and the second communication attempt being within a threshold elapsed time of the timer.

12. The apparatus of claim 8, wherein the means for performing the busy override operation comprises:

means for notifying the first party during the established communication session of attempted communication by the third party.

13. The apparatus of claim 8, wherein the means for performing the busy operation comprises one of:

means for connecting the third party to a voicemail box of the first party;

means for forwarding the third party to a fourth party;

means for returning a busy signal to the third party; or means for connecting the third party to an interactive voice response (IVR) system.

14. The apparatus of claim 8, wherein the first communication attempt includes an identifier, wherein the timer is associated with the identifier, and wherein each of the at least one additional communication attempt is associated with the identifier.

15. A non-transitory computer readable medium having instructions stored thereon that when executed by a processor cause the processor to perform a method of processing communication attempts during an established communication session over a communication network, comprising:

receiving a first communication attempt by a third party to a first party, the first party being in the established communication session with a second party over the communication network;

initiating a timer in response to the first communication attempt;

performing a busy operation with respect to the third party in response to the first communication attempt;

receiving at least one additional communication attempt by the third party during the established communication session; and performing a busy override operation with respect to the first party in response to the first communication attempt and the at least one additional communication attempt satisfying a threshold pattern of communication attempts, the threshold pattern being based on elapsed time of the timer.

16. The non-transitory computer readable medium of claim 15, further comprising:

initiating a counter that maintains a count of the first communication attempt and the at least one additional communication attempt;

wherein the threshold pattern is further based on the count of the counter.

17. The non-transitory computer readable medium of claim 16, wherein the threshold pattern includes at least one threshold count of the counter within at least one threshold elapsed time of the timer.

18. The non-transitory computer readable medium of claim 15, wherein the at least one additional communication attempt includes a second communication attempt, and wherein the threshold pattern includes the first communication attempt and the second communication attempt being within a threshold elapsed time of the timer.

19. The non-transitory computer readable medium of claim 15, wherein the step of performing the busy override operation comprises:

notifying the first party during the established communication session of attempted communication by the third party.

20. The non-transitory computer readable medium of claim 15, wherein the first communication attempt includes an identifier, wherein the timer is associated with the identifier, and wherein each of the at least one additional communication attempt is associated with the identifier.

\* \* \* \* \*